(12) United States Patent
Yasukawa et al.

(10) Patent No.: US 7,819,481 B2
(45) Date of Patent: Oct. 26, 2010

(54) HEAD REST DEVICES

(75) Inventors: Souji Yasukawa, Toyota (JP); Tomohiro Sugiura, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 138 days.

(21) Appl. No.: 12/109,719

(22) Filed: Apr. 25, 2008

(65) Prior Publication Data
US 2008/0277990 A1   Nov. 13, 2008

(30) Foreign Application Priority Data
May 11, 2007   (JP) ............................. 2007-126657

(51) Int. Cl.
*A47C 7/36*   (2006.01)
(52) U.S. Cl. ..................................... 297/408
(58) Field of Classification Search ................. 297/408, 297/220
See application file for complete search history.

(56) References Cited

U.S. PATENT DOCUMENTS

| | | | | |
|---|---|---|---|---|
| 1,576,490 A | * | 3/1926 | Randall | 52/716.4 |
| 4,711,494 A | | 12/1987 | Duvenkamp | |
| 4,807,934 A | * | 2/1989 | Sakakibara et al. | 297/403 |
| 5,011,225 A | | 4/1991 | Nemoto | |
| 5,095,257 A | * | 3/1992 | Ikeda et al. | 318/568.1 |
| 5,145,233 A | | 9/1992 | Nagashima | |
| 5,261,726 A | * | 11/1993 | Yanagishita | 297/408 |
| 5,669,666 A | | 9/1997 | Lee | |
| 5,669,668 A | | 9/1997 | Leuchtmann | |
| 6,149,233 A | * | 11/2000 | Takei et al. | 297/220 |
| 6,527,344 B2 | * | 3/2003 | Takei | 297/391 |
| 7,044,555 B2 | | 5/2006 | Saberan | |
| 7,108,323 B2 | | 9/2006 | Welch et al. | |

FOREIGN PATENT DOCUMENTS

JP   2000-102445   4/2000

OTHER PUBLICATIONS

English language Abstract of JP 2000-102445.

* cited by examiner

*Primary Examiner*—Sarah B McPartlin
(74) *Attorney, Agent, or Firm*—Greenblum & Bernstein, P.L.C.

(57) ABSTRACT

A head rest device that is incorporated into a seat back includes a head rest body, a stay that is integrally connected to the head rest body, a tilting mechanism that is fixedly connected to the seat back and is arranged and constructed to tilt the stay relative to the seat back, and a cover that is capable of covering the tilting mechanism. The cover includes a slot that is arranged and shaped to not prevent the stay from tilting. The cover includes a closure member that is arranged and constructed to cover the slot.

2 Claims, 8 Drawing Sheets

HEAD REST DEVICES

This application claims priority to Japanese patent application serial number 2007-126657, the contents of which are incorporated herein by reference.

BACKGROUND OF THE INVENTION

The present invention relates to head rest devices of vehicle seats. More particularly, the present invention relates to head rest devices in which head rest bodies are capable of tilting forwardly relative to seat backs of the vehicle seats.

A head rest device of a vehicle seat in which a head rest body is capable of tilting forwardly relative to a seat back of the vehicle seat is already known. Such a head rest device is taught, for example, by Japanese Laid-Open Patent Publication Number 2000-102445.

In the known head rest device, stays of the head rest body are rotatably attached to the seat back, so that a head rest body can be rotated forwardly. Also, vertical slots are formed in the seat back, so that the stays can rotate or move therealong when the head rest body is tilted forwardly.

Further, the seat back is covered with a covering member. The covering member has vertical openings corresponding to the vertical slots of the seat back, so that the stays can be prevented from interfering with the covering member when the head rest body is tilted forwardly. The vertical openings of the covering member are respectively provided with flexible closure members, so as to be normally covered by the closure members.

However, the covering member may possibly be moved relative to the seat back when external forces are applied thereto. If the covering member is moved relative to the seat back, the vertical openings (the closure members) of the covering member may be misaligned with the vertical slots of the seat back (i.e., the closure members may move relative to the stays). As a result, the closure members can interfere with the stays when the stays are rotated in order to tilt the head rest body forwardly. Therefore, the head rest body cannot be smoothly tilt forwardly.

Also, when the covering member is moved relative to the seat back, the closure members can interfere with the stay. As a result, the closure members can be ridden up by the stays. This may lead to an awkward appearance of the covering member (the seat back).

BRIEF SUMMARY OF THE INVENTION

Therefore, the known head rest device still is in need of improvement.

In one aspect of the present invention, a head rest device that is incorporated into a seat back may include a head rest body, a stay that is integrally connected to the head rest body, a tilting mechanism that is fixedly connected to the seat back and is arranged and constructed to tilt the stay relative to the seat back, and a cover that is capable of covering the tilting mechanism. The cover includes a slot that is arranged and shaped to not prevent the stay from tilting. The cover includes a closure member that is arranged and constructed to cover the slot.

According to this aspect, even if a covering member of the seat back is moved relative to the seat back, the closure member does not move relative to the stay because the closure member is provided to the head rest device and not the covering member. Therefore, even if the covering member of the seat back is moved relative to the seat back, the closure member can be prevented from interfering with the stay. As a result, the stay can be smoothly rotated. Thus, the head rest body can be smoothly tilted.

Also, because the closure member does not interfere with the stay even if the covering member of the seat back is moved relative to the seat back, the closure member cannot be ridden up by the stay. This may avoid an appearance of the seat back from deteriorating.

In one embodiment, the seat back may include a covering member having an opening that is arranged and shaped to correspond to the slot of the cover. The closure member may preferably be stitched on the covering member along a periphery of the opening.

According to this embodiment, if the covering member is moved relative to the seat back, the opening of the covering member can be reliably prevented from moving relative to the closure member of the cover. Therefore, even if the covering member is largely moved relative to the seat back, the covering member can be reliably prevented from interfering with the stay, so that the stay can be smoothly rotated.

In another embodiment, the closure member may preferably be covered with a skin member.

According to this embodiment, when the stay rotates, the closure member can be effectively prevented from frictionally contacting the stay. This structure may effectively minimize or eliminates noise caused by frictional contacting of the closure member and the stay.

Other objects, features and advantages of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Detailed representative embodiments of the present invention are shown in FIG. 1 to FIG. 9.

First Detailed Representative Embodiment

A first detailed representative embodiment of the present invention will be described with reference to FIGS. 1 to 4.

Figure 1:
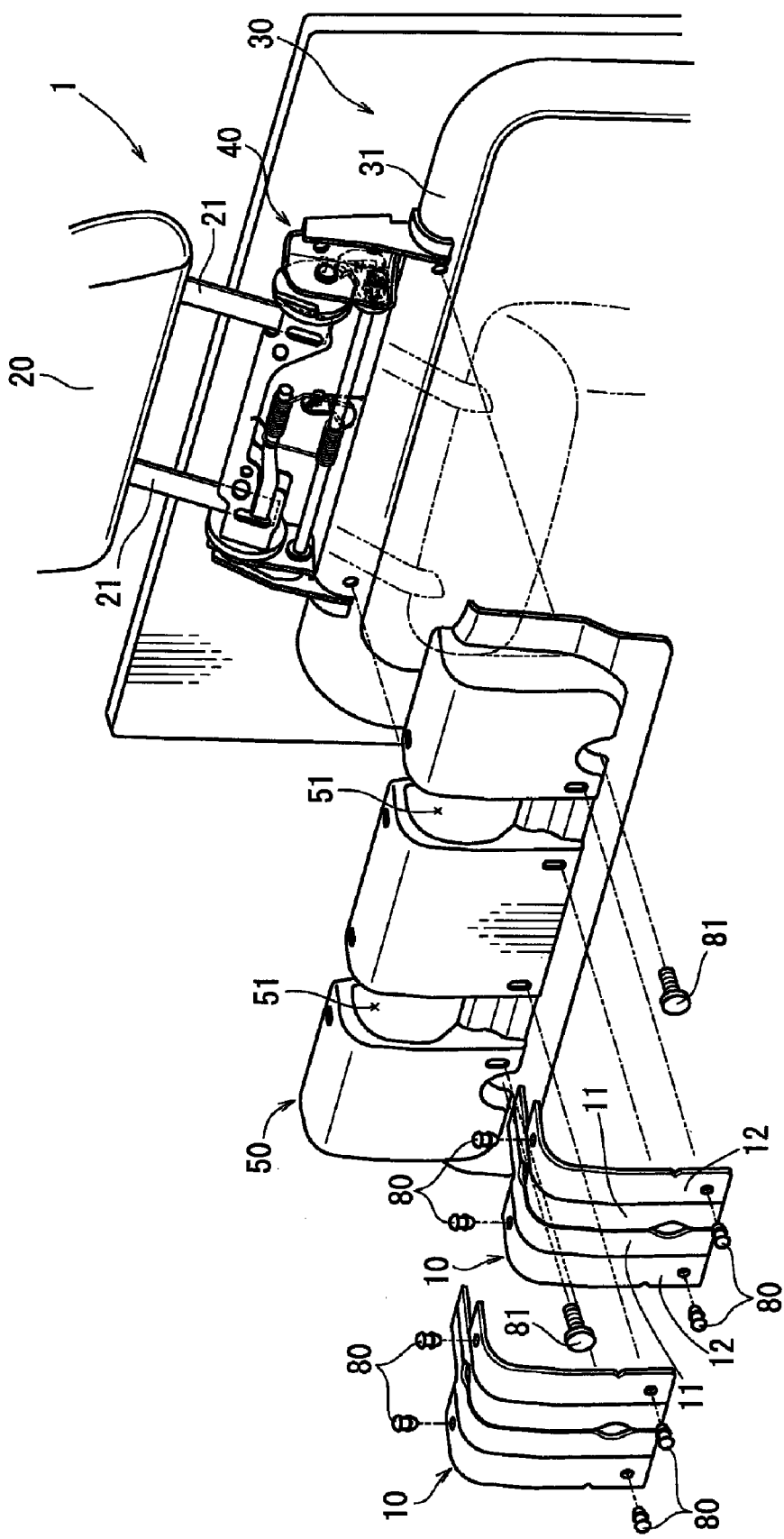
FIG. 1 is an exploded perspective view of a head rest device according to a first representative embodiment of the present invention.

As shown in FIG. 1, a representative head rest device 1 is attached to a seat back 30 of a vehicle seat. The head rest device 1 may preferably include a head rest body 20, stays 21 that are integrally connected to the head rest body 20, a tilting mechanism 40 that is fixedly connected to a back frame 31 of the seat back 30, and a cover 50 that is capable of covering the tilting mechanism 40.

The head rest body 20 may preferably be formed from a cushioning material, so as to comfortably support a head of a passenger sitting on the vehicle seat. The stays 21 connected to the head rest body 20 may preferably be formed from metal pipes. The stays 21 are respectively rotatably connected to the back frame 31. Also, the stays 21 are respectively operatively coupled to the tilting mechanism 40.

The tilting mechanism 40 is arranged and constructed to rotate the stays 21 back and forth relative to the seat back 30, thereby tilting the head rest body 20 back and forth between a use position shown by solid lines in FIG. 1 and a retracted position shown by broken lines in FIG. 1. Further, the tilting mechanism 40 may preferably has a locking mechanism (not shown) that is capable of immovably retaining the stays 21 at the use and retracted positions of the head rest body 20.

As shown in FIG. 1, the cover 50 is integrally formed from synthetic resins, preferably rigid or hard synthetic resins. As will be appreciated, the cover 50 is shaped to reliably cover and protect the tilting mechanism 40. The cover 50 has a pair of vertical slots 51 that correspond to the stays 21 when the cover 50 is attached to the tilting mechanism 40, so as to not prevent the stays 21 from rotating back and forth, or in other words so as to allow the stays 21 to tilt back and forth.

Figure 2:
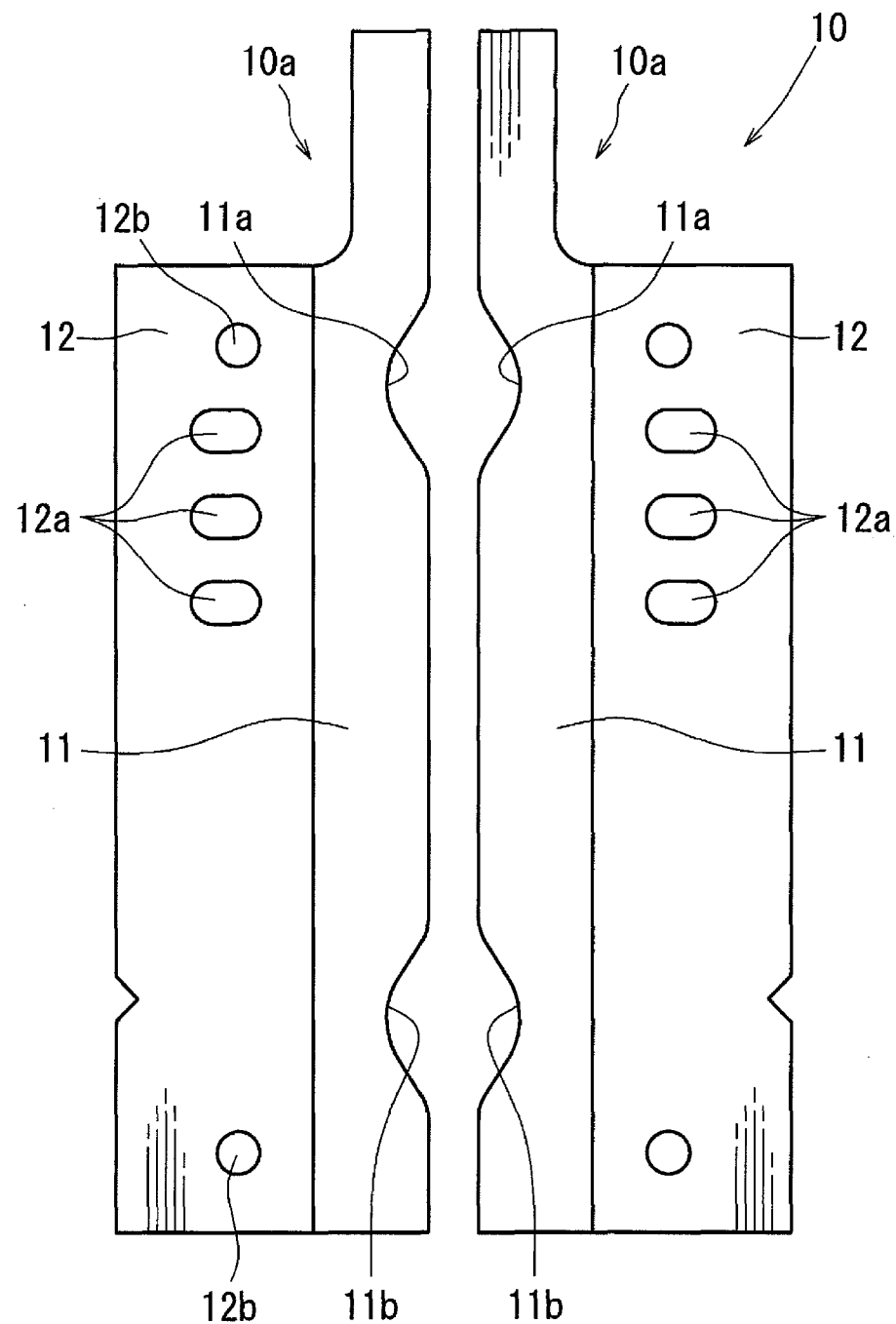
FIG. 2 is a plan view of a closure member constituting a cover of the head rest device, illustrating a condition in which it is not attached to the cover.

As shown in FIG. 1, the cover 50 is provided with a pair of elongated closure members 10 in order to cover the vertical slots 51. As shown in FIG. 2, each of the closure members 10 may preferably be composed of a pair of closure member elements 10a that are substantially symmetrically formed. Each of the closure member elements 10a is composed of a first or inner elongated strip-shaped closure portion 11 and a second or outer elongated strip-shaped attachment portion 12 that is integrated with the inner closure portion 11. The inner closure portion 11 is formed from elastic synthetic resins. Conversely, the outer attachment portion 12 is formed from rigid synthetic resins. The inner closure portion 11 and the outer attachment portion 12 may preferably be integrally formed by two-color molding.

Further, as shown in FIG. 2, each of the inner closure portions 11 of the closure members 10 (the closure member elements 10a) has a pair of curved removed portions 11a and 11b that are formed in an inner periphery thereof. The respective removed portions 11a and 11b of the closure members 10 may preferably be positioned so as to respectively be aligned with the stays 21 when the head rest body 20 is in the use position and the retracted position. Due to formation of the removed portions 11a and 11b, the inner closure portions 11 can be effectively prevented from interfering with the stays 21 when the head rest body 20 is in the use and retracted positions. Therefore, the inner closure portions 11 can be prevented from riding up by the stays 21 when the head rest body 20 is in the use and retracted positions. This can ensure a good appearance of the seat back 30.

As shown in FIG. 2, each of the outer attachment portions 12 of the closure members 10 (the closure member elements 10a) has a pair of pin insertion holes 12b that are formed in longitudinal opposite end portions thereof. Also, each of the outer attachment portions 12 has a serious of elongated openings 12a that are formed therein. The openings 12a may preferably be longitudinally aligned with each other. Due to the openings 12, a weakened portion is formed in the outer attachment portion 12, so that the outer attachment portion 12 can be easily bent or folded thereabout.

The closure members 10 (the closure member elements 10a) thus constructed may preferably be positioned on the cover 50 such that the inner closure portions 11 can be aligned with the slots 51. The closure members 10 thus positioned are bent or folded (substantially L-shaped) so as to conform to the profile of the cover 50. As will be recognized, at this time, the closure members 10 can be easily and reliably bent due to the weakened portions formed in the outer attachment portions 12 of the closure members 10. Fastening pins 80 are pushed into the pin insertion holes 12b of the outer attachment portions 12. Thus, the closure members 10 may preferably be secured to the cover 50.

The cover 50 provided with the closure members 10 may preferably be secured to the back frame 31 via set screws 81 (FIG. 1), so as to cover the tilting mechanism 40. Thus, as shown in FIG. 3, the head rest device 1 may preferably be incorporated into the seat back 30.

Figure 3:
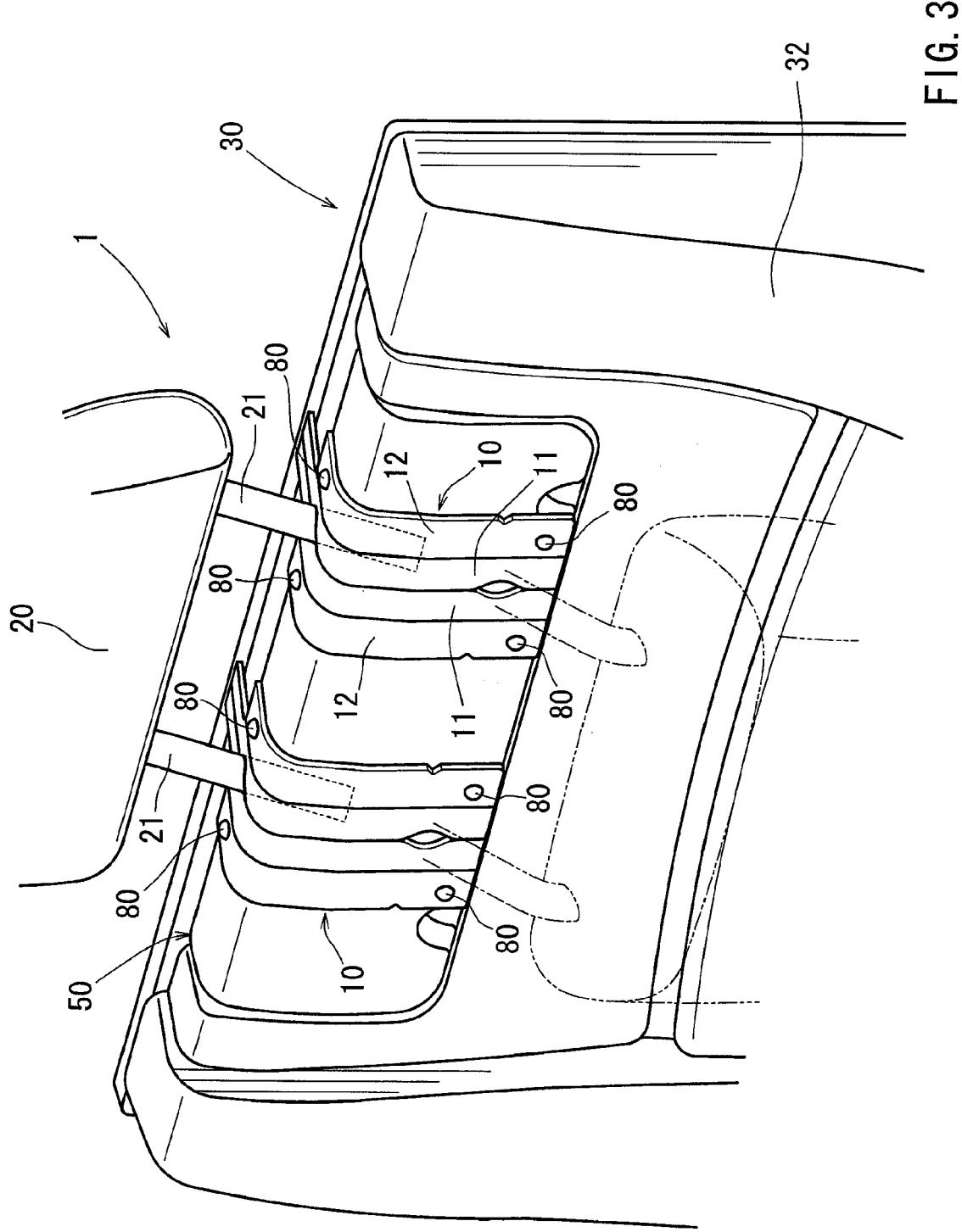
FIG. 3 is a perspective view of the head rest device that is integrated with a seat back, illustrating a condition in which a covering member is omitted.
Figure 4:
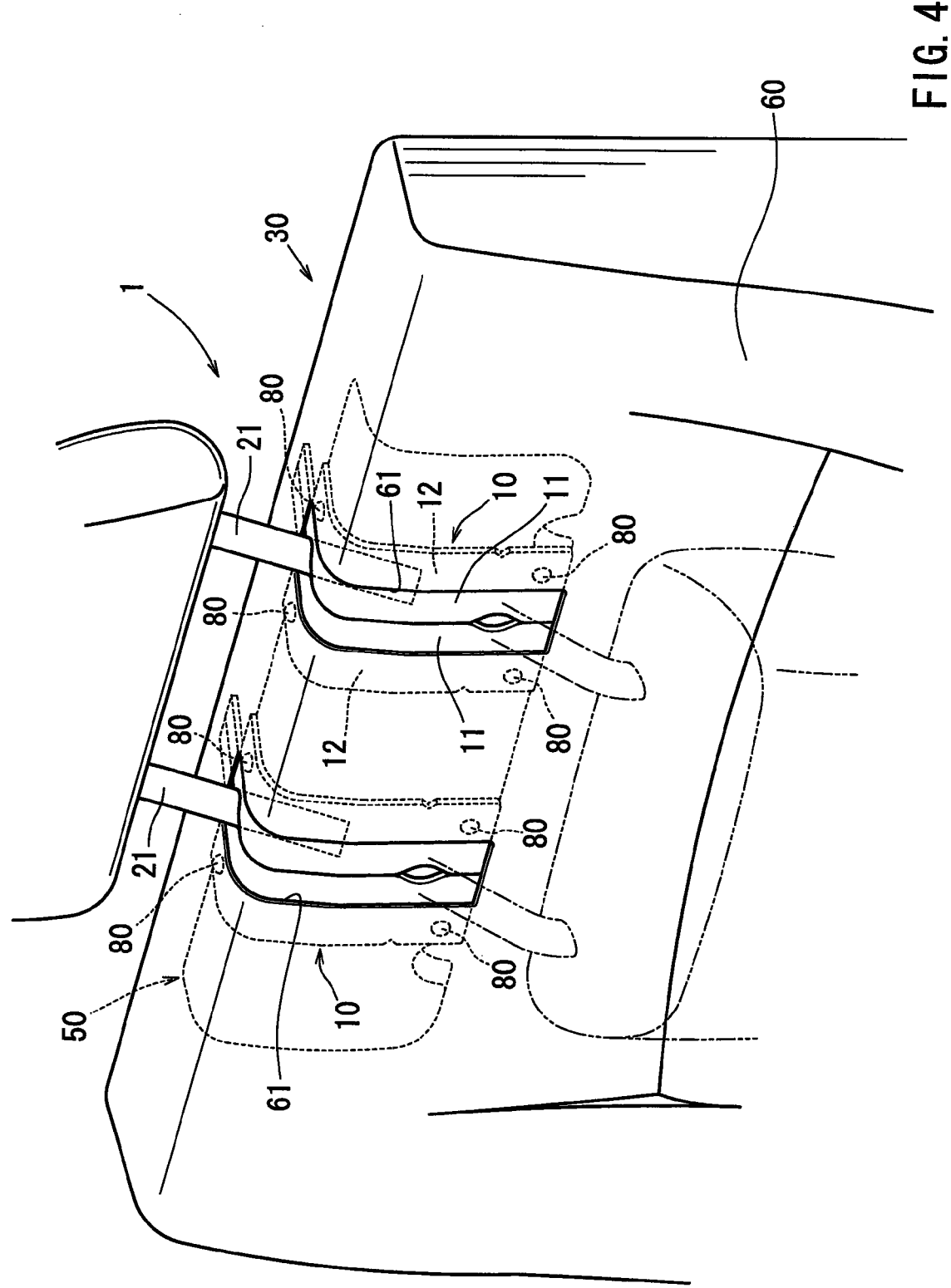
FIG. 4 is a perspective view of the head rest device that is integrated with the seat back, illustrating a condition in which the covering member is attached to the seat back.

Further, as shown in FIG. 3, a seat back pad 32 constituting the seat back 30 is attached to the back frame 31 after the head rest device 1 is incorporated into the seat back 30. Further, as shown in FIG. 4, the seat back pad 32 is covered with a covering member 60. As will be recognized, the covering member 60 has vertical openings 61 that are arranged and shaped to correspond to the vertical slots 51 of the cover 50 (i.e., the inner closure portions 11 of the closure members 10), so as to not interfere with the stays 21 when the stays 21 are rotated (i.e., when the head rest body 20 is tilted).

Next, an operation of the head rest device 1 thus constructed will be described. In order to tilt the head rest body 20 forwardly from the use position toward the retracted position, the tilting mechanism 40 is actuated in a normal direction. Upon actuation of the tilting mechanism 40, the stays 21 are rotated forwardly, so that the head rest body 20 can be tilted forwardly. As will be recognized, at this time, the stays 21 can be smoothly rotated forwardly while spreading the inner closure portions 11 of the closure member elements 10a (the closure members 10) outwardly. That is, the stays 21 can be rotated forwardly without substantially interfering with the inner closure portions 11. Thus, the head rest body 20 can smoothly tilt forwardly. Naturally, in order to tilt the head rest body 20 rearwardly from the retracted position toward the use position, the tilting mechanism 40 can be simply actuated in a reverse direction.

According to the head rest device 1 of the present embodiment, even if the covering member 60 is moved relative to the seat back 30, the inner closure portions 11 (the closure members 10) cannot be moved relative to the stays 21. This is because the inner closure portions 11 (the closure members 10) are provided to the head rest device 1 (the cover 50) and not the covering member 60. Therefore, even if the covering member 60 is moved relative to the seat back 30, the closure members 10 (the inner closure portions 11) can be effectively prevented from interfering with the stays 21. As a result, the stays 21 can be smoothly rotated back and forth, so that the head rest body 20 can smoothly tilt back and forth.

In addition, because the inner closure portions 11 can be prevented from moving relative to the stays 21 even if the covering member 60 is moved relative to the seat back 30, the inner closure portions 11 cannot be ridden up by the stays 21. Therefore, an appearance of the seat back 30 can be prevented from deteriorating.

Second Detailed Representative Embodiment

Figure 5:
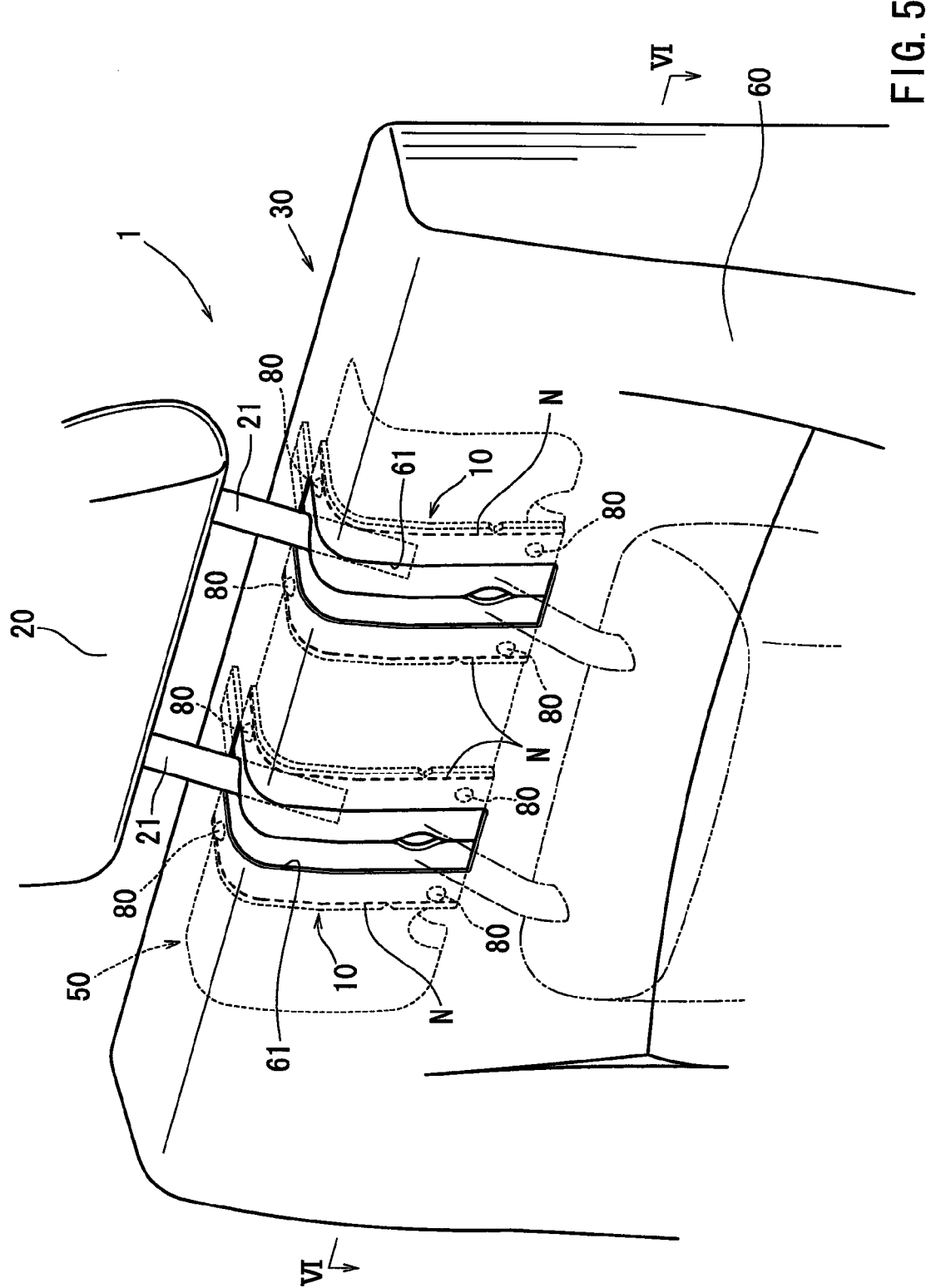
FIG. 5 is a perspective view similar to FIG. 4, which corresponds to a second representative embodiment of the present invention.
Figure 6:
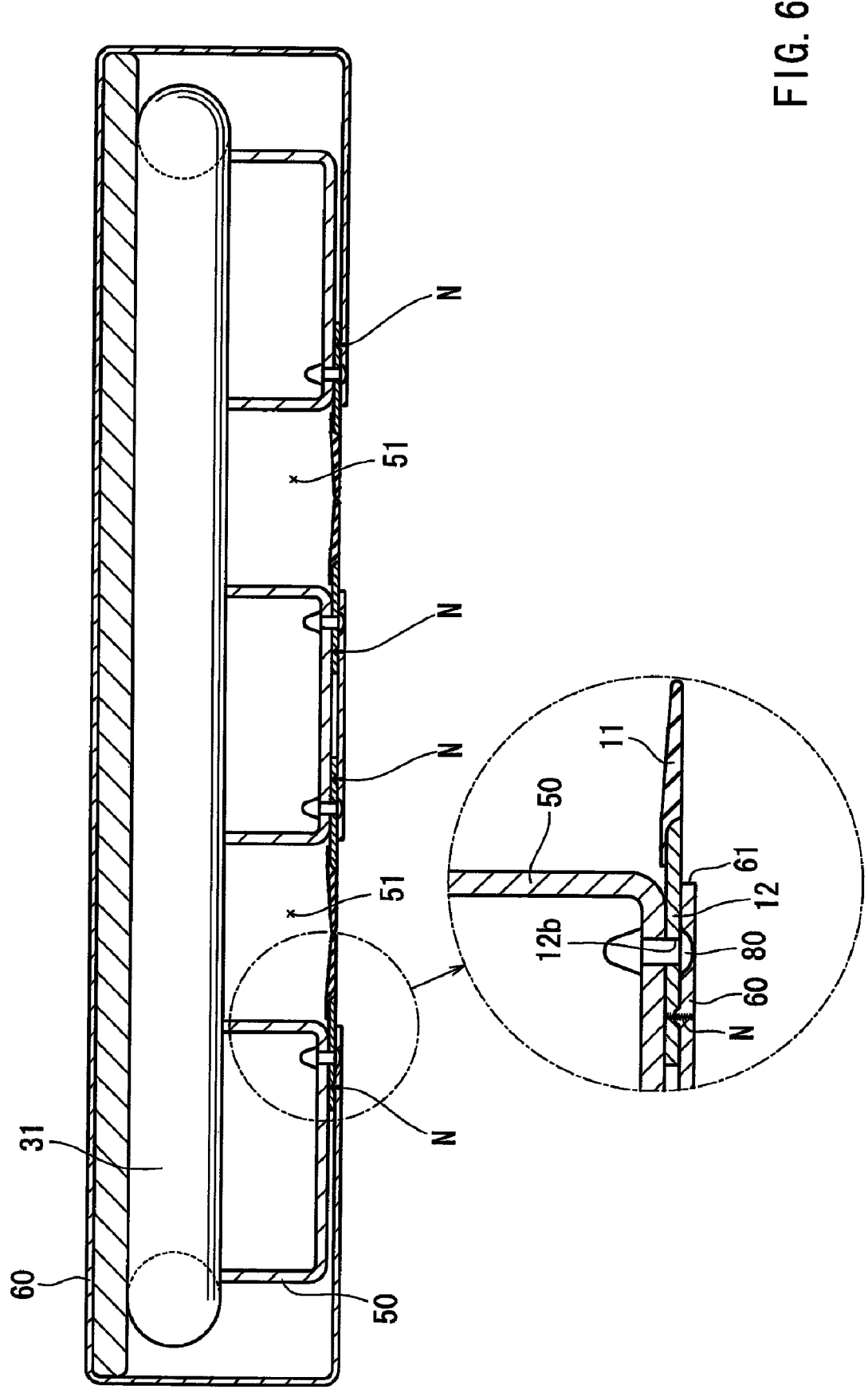
FIG. 6 is a cross-sectional view taken along line VI-VI in FIG. 5.

The second detailed representative embodiment will now described in detail with reference to FIGS. 5 and 6.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

In this embodiment, unlike the first embodiment, the outer attachment portions 12 of the closure members 10 are stitched on the covering member 60 of the seat back 30 along stitching lines N that extend along longitudinal peripheries of the vertical openings 61 of the covering member 60. As will be appreciated, in this case, the closure members 10 may preferably be attached to the cover 50 after the outer attachment portions 12 are stitched on the covering member 60.

According to the head rest device 1 of the second embodiment, if the covering member 60 is moved relative to the seat back 30, the vertical openings 61 of the covering member 60 cannot be misaligned with the inner closure portions 11 (the closure members 10). Therefore, even if the covering member 60 is largely moved relative to the seat back 30, the covering member 60 can be reliably prevented from interfering with the stays 21, so that the stays 21 can be smoothly rotated back and forth. In addition, even if the covering member 60 is largely moved relative to the seat back 30, the covering member 60 cannot be ridden up by the stays 21.

Third Detailed Representative Embodiment

Figure 7:
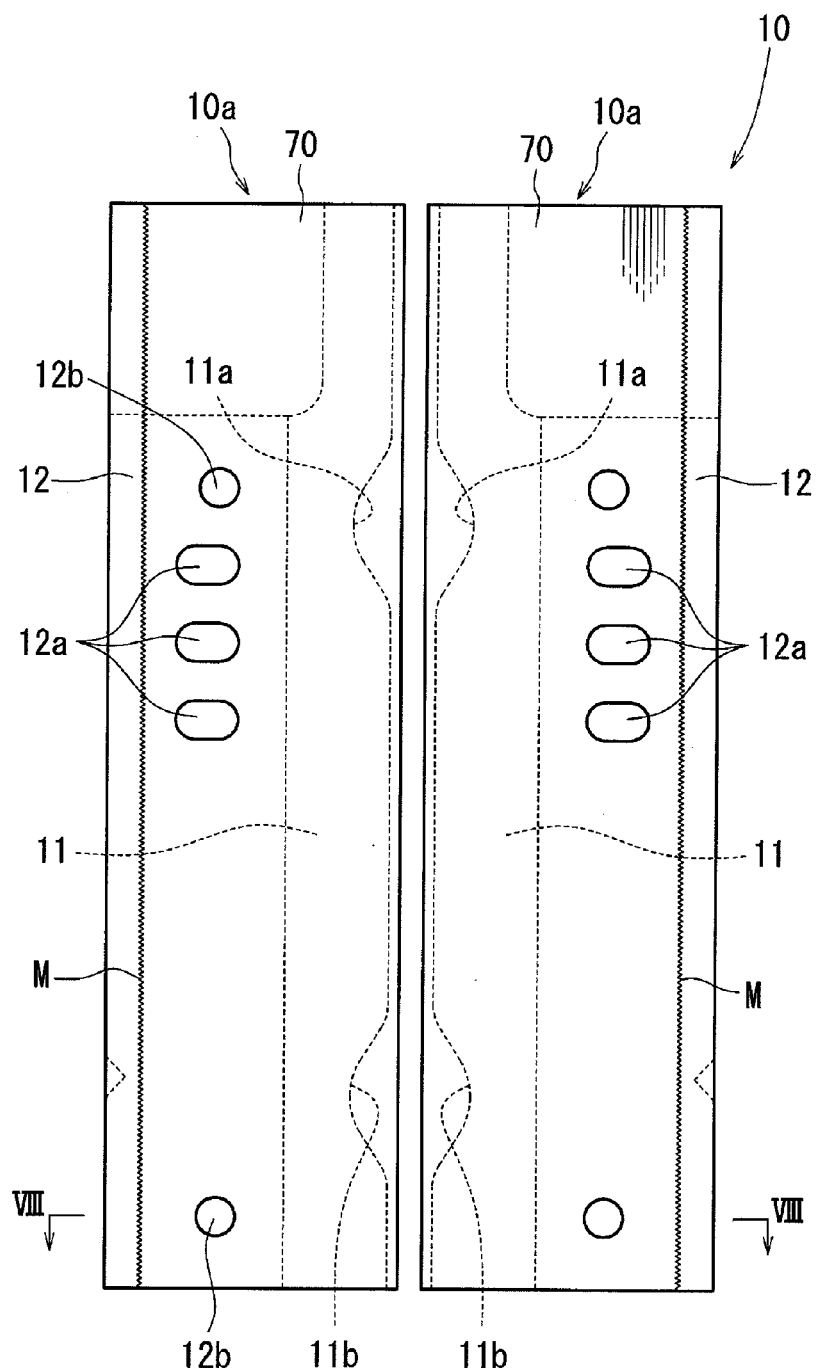
FIG. 7 is a plan view of a closure member constituting a cover of a head rest device according to a third representative embodiment of the present invention.
Figure 8:
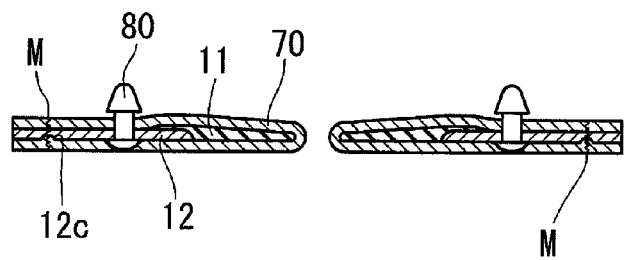
FIG. 8 is a cross-sectional view taken along line VI-VI in FIG. 7.
Figure 9:
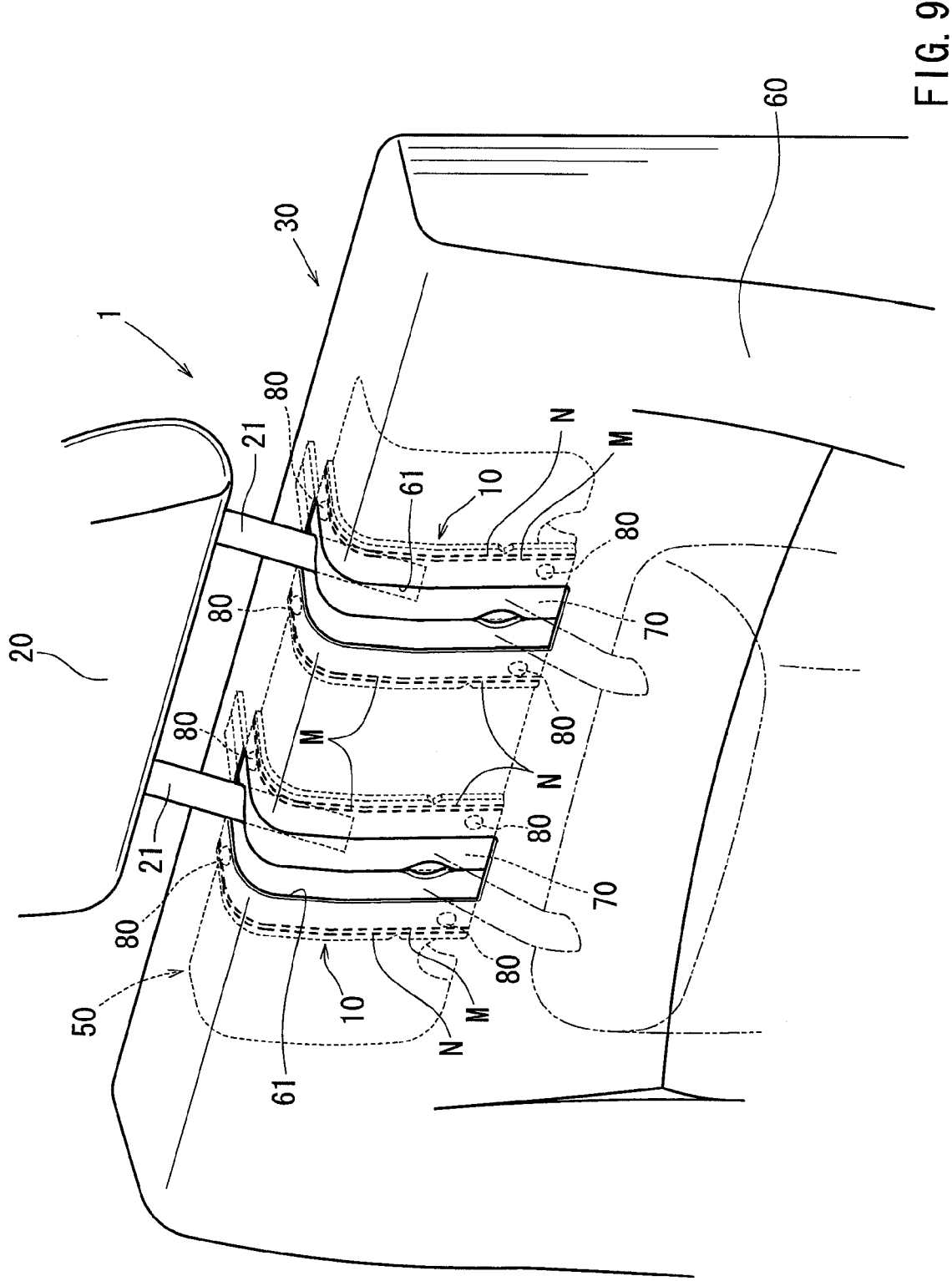
FIG. 9 is a perspective view similar to FIG. 4.

The third detailed representative embodiment will now be described with reference to FIGS. 7-9.

Because the third embodiment relates to the second embodiment, only constructions, elements and operations that are different from the second embodiment will be explained in detail. Elements that are the same in the second and third embodiments will be identified by the same reference numerals and a detailed description of such elements will be omitted.

In this embodiment, the closure member elements 10a constituting the closure members 10 are completely covered or surrounded with skin members 70. The skin members 70 are stitched on the outer attachment portions 12 of the closure members 10 along stitching lines M that extend in parallel with the stitching lines N. Further, the outer attachment portions 12 may preferably have grooves 12c corresponding to the stitching lines M, so that the skin members 70 can be easily stitched thereto. As will be appreciated, in this case, the fastening pins 80 may preferably be inserted into the pin insertion holes 12b of the outer attachment portions 12 before the skin members 70 are stitched on the outer attachment portions 12. Further, the skin members 70 may preferably be formed from the same material as the covering member 60.

According to the head rest device 1 of the third embodiment, the inner closure portions 11 of the closure member elements 10a (the closure members 10) can be effectively prevented from directly contacting the stays 21 because the closure member elements 10a are wholly covered with the skin members 70. Therefore, when the stays 21 move or rotate, the skin members 70 may preferably avoid the inner closure portions 11 of the closure member elements 10a from frictionally contacting the stays 21. This may minimize or eliminate noise caused by frictional contact of the inner closure portions 11 and the stays 21. Also, the skin members 70 may increase an attractive appearance of the head rest device 1 (the seat back 30).

Naturally, various changes and modifications may be made to the present invention without departing from the scope of the invention. For example, in the embodiments, the inner closure portion 11 and the outer attachment portion 12 are integrally formed with each other. However, the inner closure portion 11 and the outer attachment portion 12 can be separately formed and then be combined with each other, if necessary. In addition, the outer attachment portion 12 can be omitted, if necessary.

Further, in the embodiments, the tilting mechanism 40 is fixedly connected to the back frame 31 of the seat back 30. However, the tilting mechanism 40 can be positioned in the head rest body 20 of the head rest device 1, if necessary.

In this structure, unlike the embodiments described herein, the tilting mechanism 40 may preferably be arranged and constructed to tilt the head rest body 20 relative to the stay 21. As will be recognized, in this structure, the stays 21 are unrotatably connected to the back frame 31. Further, in this structure, vertical openings (not shown) corresponding to the vertical openings 61 are formed in a covering member (not shown) of the head rest main body 20. The vertical openings are arranged and shaped to correspond to the vertical slots 51 of the cover 50, so as to not interfere with the stays 21 when the head rest body 20 is tilted.

The invention claimed is:

1. A head rest device that is incorporated into a seat back, comprising:
   a head rest body;
   a stay that is integrally connected to the head rest body;
   a tilting mechanism that is fixedly connected to the seat back and is arranged and constructed to tilt the stay relative to the seat back; and
   a cover that is capable of covering the tilting mechanism, wherein the cover includes a slot that is arranged and shaped to not prevent the stay from tilting,
   wherein the cover includes a closure member that is arranged and constructed to cover the slot,
   wherein the seat back comprises a covering member having an opening that is arranged and shaped to correspond to the slot of the cover, and
   wherein the closure member is stitched on the covering member along a periphery of the opening.

2. A head rest device that is incorporated into a seat back, comprising:
   a head rest body;
   a stay that is integrally connected to the head rest body;
   a tilting mechanism that is fixedly connected to the seat back and is arranged and constructed to tilt the stay relative to the seat back; and
   a cover that is capable of covering the tilting mechanism, wherein the cover includes a slot that is arranged and shaped to not prevent the stay from tilting in a tilting direction between a use position and a retracted position of the head rest body, wherein the cover includes a closure member that is arranged and constructed to cover the slot, and wherein the closure member is covered with a skin member along the entire tilting direction of the stay so as to allow the stay to tilt between the use position and the retracted position of the head rest body.

* * * * *